Dec. 13, 1960  H. F. NELSON  2,963,811
FISH POINT FOR ARROWS
Filed May 28, 1958
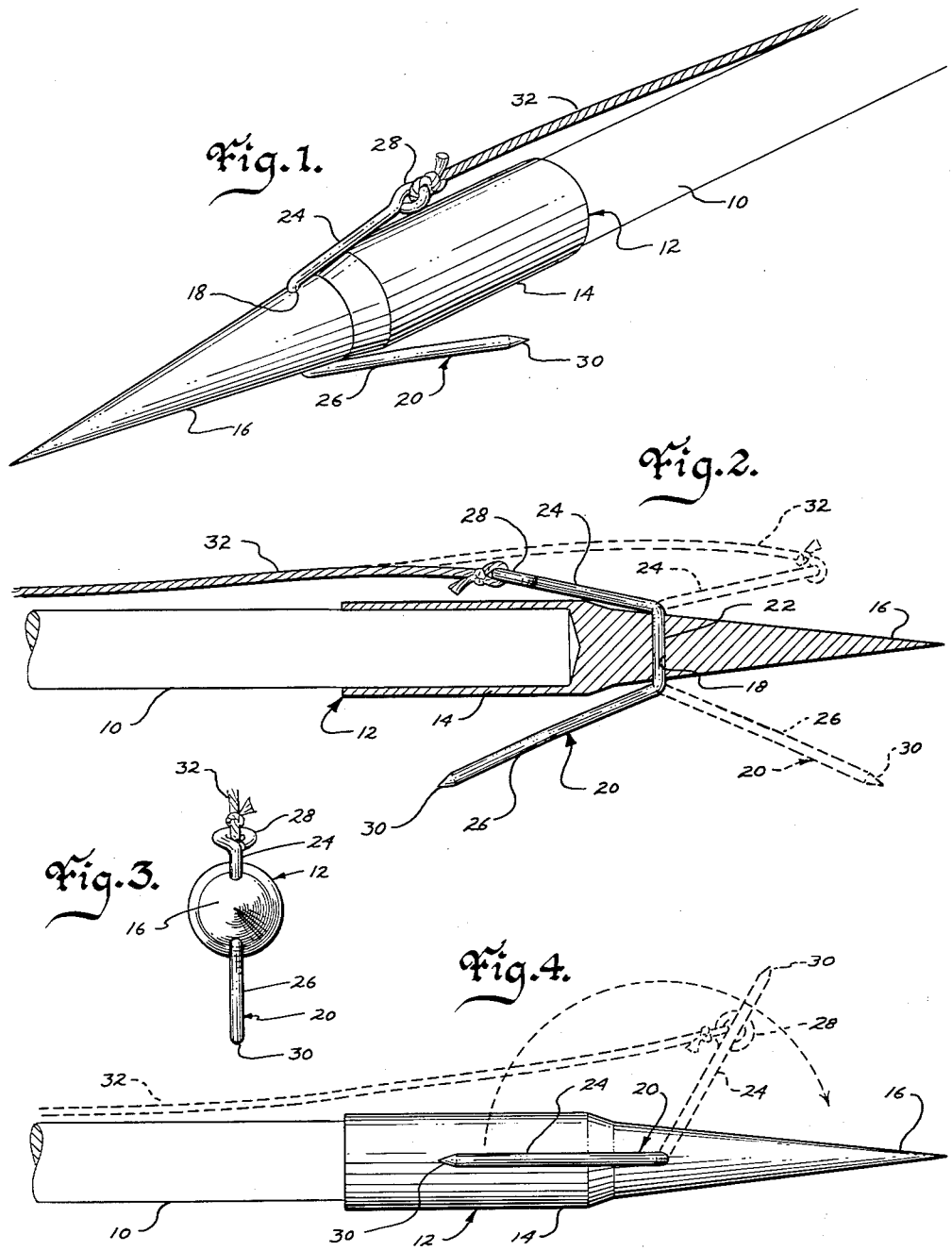
Witness
Edward P. Seeley
Inventor
Howard F. Nelson
by Donald H. Zarley
Attorney

United States Patent Office 2,963,811
Patented Dec. 13, 1960

2,963,811

FISH POINT FOR ARROWS

Howard F. Nelson, 1021 Main St., Iowa Falls, Iowa

Filed May 28, 1958, Ser. No. 738,350

2 Claims. (Cl. 43—6)

My invention relates to archery and more particularly to a point to be used on arrows for purposes of shooting fish.

Many special arrowheads have been devised to assist the bowman in his quest for game. As archery has grown more and more popular, the science of perfecting arrowheads for various game has become more and more exact. At one time, the Indian used the bow and arrow to catch fish for food purposes. Today, the shooting of fish with the bow and arrow has become a popular sport and an effective means of eradicating rough fish from fishing waters.

Some arrowheads have been designed to facilitate the retaining of the fish after it has been shot. Most such arrowheads have a barb element secured thereto to perform the same function as a fishhook. Some of these barb elements known to me make it very difficult to separate the arrowhead from the fish. Other barbs known to me can be manually removed with respect to the arrowhead to facilitate removal but a barb which has just passed through a fish is generally unpleasant to grasp. If the arrowhead does not pass through the fish, it must be manually pushed therethrough before these movable barbs can be operated.

Therefore, the principal object of my invention is to provide a fish point for arrows which will keep the arrowhead intact with the fish and which will permit ease in removing the arrowhead from the fish.

A further object of my invention is to provide a fish point for arrows which will have a reversible barb that will automatically reverse itself upon being withdrawn through the fish.

A still further object of my invention is to provide a fish point for arrows which can be withdrawn directly from the fish upon being embedded therein.

Still further object of my invention is to provide a fish point for arrows that is economical of manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my device as the arrow enters the fish from flight;

Fig. 2 is a partial sectional view taken along the longitudinal axis of the arrow shown in Fig. 1. The dotted lines in the figure show the barb as it is being reversed;

Fig. 3 is a front elevational view of my device, and

Fig. 4 is a top plan view of my device as the arrow enters the fish from flight. The dotted lines in this figure show the barb as it is being reversed.

I have used the numeral 10 to designate the shaft of an arrow. My fish point 12 is comprised of an elongated hollow arrowhead or cylinder portion 14 which has its forward end terminating in a sharpened point 16. Cylinder portion 14 forcibly receives the forward end of shaft 10 as clearly shown in Fig. 2.

A straight hole 18 extends through the rearward portion of sharpened point 16 and extends on a line perpendicular to the longitudinal axis of the point. A barb element 20 is rotatably mounted in hole 18 by its center section 22. Barb element 20 is bent rearwardly at the ends of center section 22 and is used to form end sections 24 and 26. The end sections 24 and 26 are generally in alignment with shaft 10. The outer ends of the end sections 24 and 26 terminate in eyelet 28 and sharpened point 30, respectively. A fishing line 32 can be fastened to the barb element 20 by being tied to eyelet 28.

The normal operation of my device is as follows: The fishing line 32 is attached to the eyelet 28 of barb element 20 to effect the repossession of the fish and the arrow. Generally, the structure shown in Fig. 1 passes completely through the fish. After removing all tension from line 32, the arrow shaft 10 is pulled in a direction which would withdraw the arrow point 12 from the fish in the opposite direction that the arrow point entered the fish. The barb element 20 is generally deflected from its alignment with the longitudinal axis of the shaft 10 when the tension in line 32 has been removed. But even if this deflection of the barb element with respect to the shaft has not yet taken place, the engagement of the point 30 of the barb element with the fish as the arrow is being withdrawn will tend to deflect the barb element as the body of the fish resists the re-entry of the sharpened point 30. This result will always follow because it is very difficult to withdraw the arrow along the precise line that the arrow entered the fish. The slightest deflection of the barb element as described above will permit the barb to assume a reversed position (shown by the dotted lines in Figs. 2 and 4) as the arrow is withdrawn from the fish. Obviously, the barb offers no resistance to the withdrawal of the arrow from the fish when the barb element has assumed the reversed position shown by the dotted lines in Figs. 2 and 4. Usually, the barb element 20 will reverse itself as soon as line 32 is slacked, but the subsequent withdrawal of the arrow will effect the reversal of the barb element if it has not already taken place. Thus, my barb element can be reversed without touching the barb element or any portion of the fish point 12.

If the structure shown in Fig. 1 is embedded in the fish, the arrow can be slightly moved in a lateral direction before being withdrawn. The lateral movement of the arrow will cause some deflection of barb element 20 with respect to the arrow shaft 10, and the subsequent withdrawal of the arrow will again cause the barb element to rotate to its reversed position. Thus, my arrow point can be directly withdrawn from the fish regardless of whether or not the arrow penetrates the fish. It is seen, therefore, that my invention accomplishes at least all of its stated objectives.

Some changes may be made in the construction and arrangement of my fish point for arrows without departing from the real spirit and purpose of my invention, and it is my intention to cover by my claims, any modified forms of structure or use of mechanical equivalents which may be reasonably included within their scope.

I claim:

1. In a fish point for arrows, a member adapted to be placed on the forward end of an arrow shaft, a barb element freely rotatably secured to said member, said barb element having end portions extending at an angle from said member, an eyelet on said barb element, and a line rigidly permanently tied by one of its ends to said eyelet on said barb element, said line normally extending in a rearward direction from said barb element, said line being free from direct operative engagement with said member or an arrow shaft upon which said member is mounted, said line causing said end portions of said barb to point rearwardly when tension is exerted thereon, said barb being free to be rotated on said member when tension is released from said line so that the end portions of said barb can thereupon be pointed toward the forward end of said arrow.

2. In a fish point for arrows, an arrowhead having a sharpened point and adapted to be placed on the forward end of an arrow, a barb freely rotatably extending through said arrowhead and normally being capable of free rotational movement therein, end portions on said barb adapted to dwell in a plane passing through the longitudinal axis of said arrowhead at times, said end portions pointing toward the rearward end of said arrowhead in a first position within said plane, said end portions pointing toward the forward end of said arrowhead when rotated one hundred and eighty degrees from said first position to a second position, an eyelet on said barb element, and a line rigidly permanently tied by one of its ends to said eyelet on said barb element, said line normally extending in a rearward direction from said barb element, said line being free from direct operative engagement with said member or an arrow shaft upon which said member is mounted, said line holding said barb in said first position when under tension, and releasing said barb for free rotation to said second position when tension is released.

References Cited in the file of this patent
UNITED STATES PATENTS

| | | |
|---|---|---|
| 720,137 | Harris | Feb. 10, 1903 |
| 1,672,498 | Otto | June 5, 1928 |
| 2,599,626 | Gottschalk et al. | June 10, 1952 |
| 2,753,643 | Recker | July 10, 1956 |
| 2,807,495 | Pillstrom | Sept. 24, 1957 |